July 26, 1960  C. T. NATIONS  2,946,136
STRIP FEEDING AND MEASURING MECHANISM
Filed Dec. 21, 1955  2 Sheets-Sheet 1
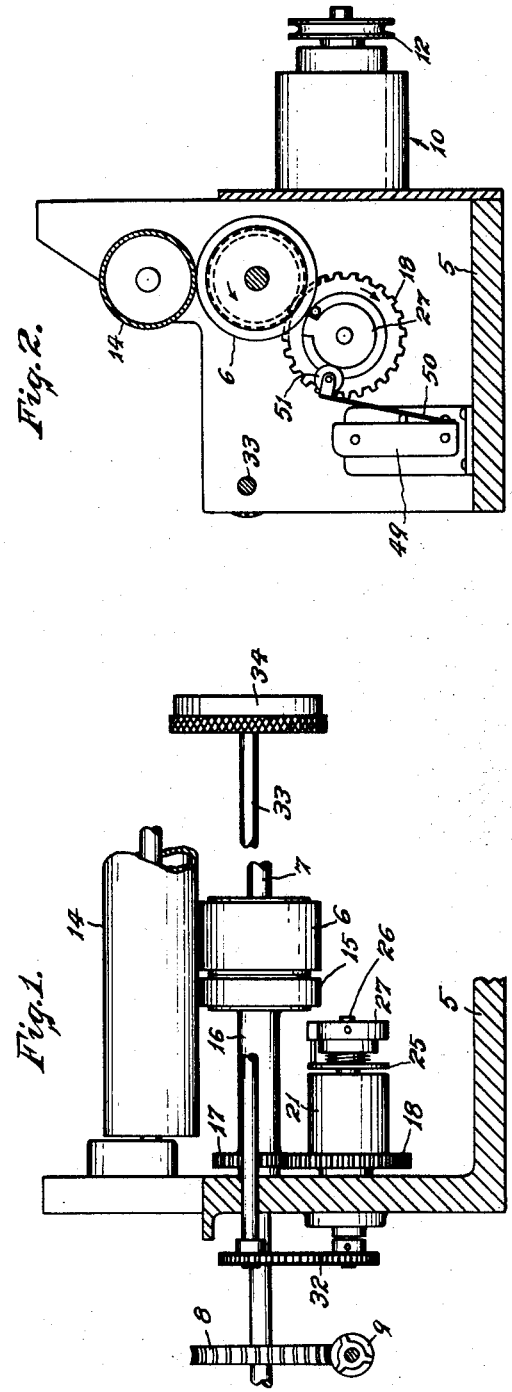
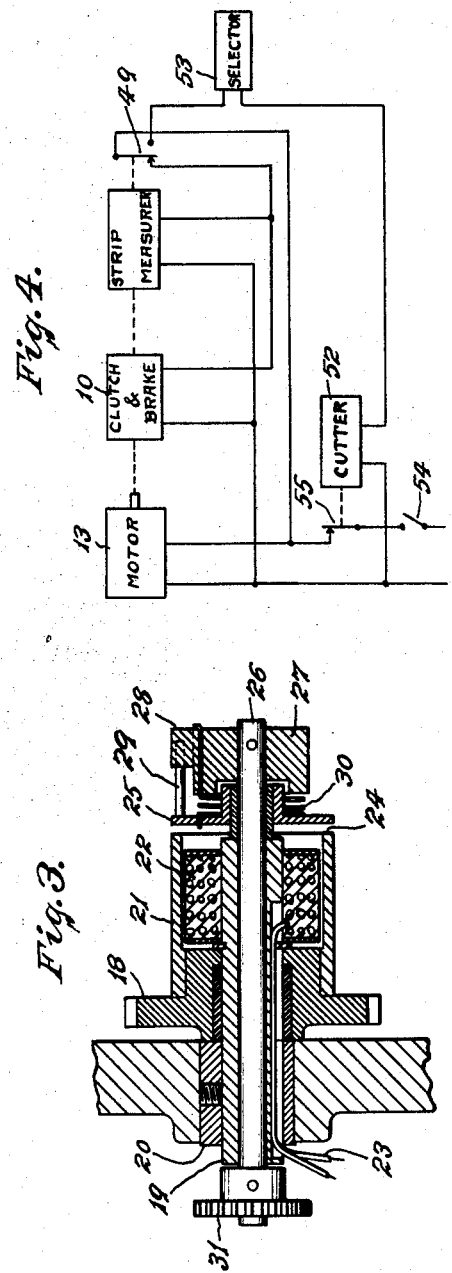
INVENTOR.
CARL T. NATIONS.
BY
Louis V. Lucia
ATTORNEY.

July 26, 1960  C. T. NATIONS  2,946,136
STRIP FEEDING AND MEASURING MECHANISM
Filed Dec. 21, 1955  2 Sheets-Sheet 2
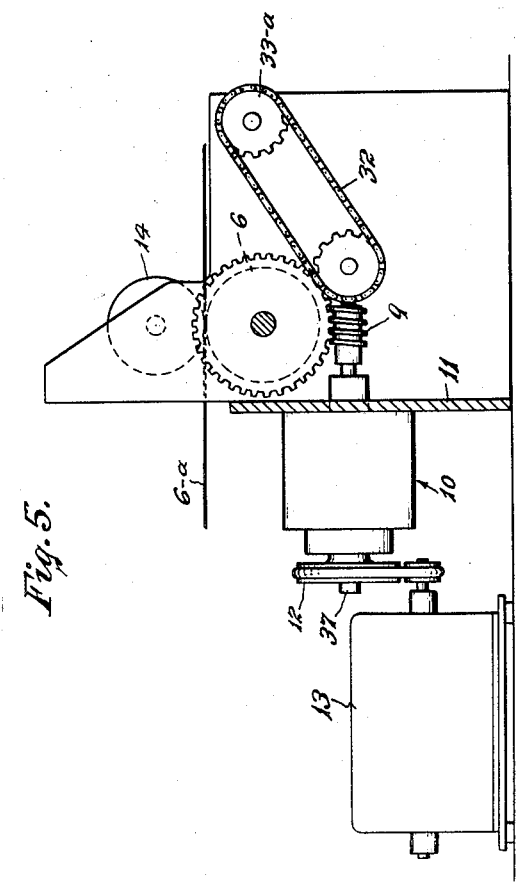
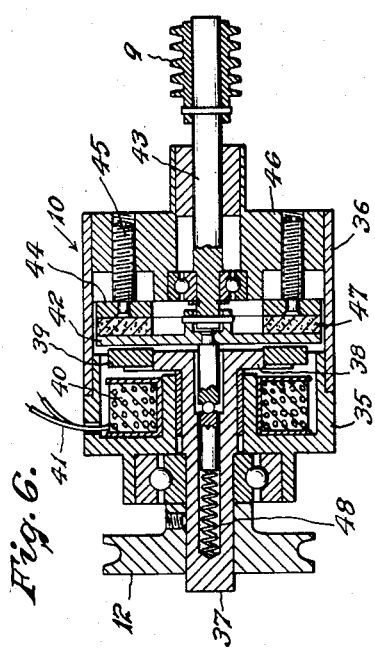
INVENTOR.
CARL T. NATIONS.
BY Louis V. Lucia
ATTORNEY.

United States Patent Office 2,946,136
Patented July 26, 1960

2,946,136

STRIP FEEDING AND MEASURING MECHANISM

Carl T. Nations, Orlando, Fla., assignor to National Electronics Distributors, Incorporated, Orlando, Fla., a corporation of Florida Filed Dec. 21, 1955, Ser. No. 554,458

7 Claims. (Cl. 33—132)

This invention relates to a strip feeding and measuring mechanism and more particularly to such a mechanism which is intended for use in automatic machines such as the automatic photographic printing machine.

It is an object of the present invention to provide improved means for increasing the accuracy of such machines in measuring the amount of paper strip that is fed therethrough and thereby cause said machine to produce photographic prints which are of uniform length.

A further object of this invention is to provide for such machines a magnetic clutch and brake device which will automatically disconnect the driving motor from the feed roll and simultaneously therewith apply a braking action to instantly stop the rotation of the feed roll and thereby prevent any overrun of the strip which would render it impossible to accurately control the length of strip which is fed by the roll during each cycle of operation of the machine.

A further object is to provide an improved mechanism for measuring the amount of strip moved by the feed roll and accurately controlling the operation of the clutch in accordance with adjustments of the measuring device for desired lengths of the strip.

Further objects and advantages of the present invention will be more clearly understood from the following description and from the accompanying drawings in which:

Fig. 1 is a sectional rear view of a portion of an automatic photographic printing machine, such as shown in the said copending application, and illustrating my improved measuring mechanism.

Fig. 2 is a sectional side view thereof.

Fig. 3 is an enlarged sectional rear view of the measuring device.

Fig. 4 is a diagrammatic view of an electrical circuit embodying the present invention.

Fig. 5 is a sectional view of the side of the machine opposite that shown in Fig. 2.

Fig. 6 is an enlarged sectional side view of the clutch and brake device.

As shown in the accompanying drawings and fully described in the said copending application, the automatic machine for which the present invention is particularly intended, includes a base 5 upon which there is rotatably mounted the feed roll 6 which is carried on a drive shaft 7 having secured thereto a worm gear 8 that is rotated by a worm pinion 9 which is included in my improved clutch and brake device 10, illustrated in Fig. 6.

The said clutch and brake device is preferably mounted upon the wall 11 and has a pulley 12 that is rotated by a suitable electric motor 13.

The pressure roll 14 is adapted to rest upon the feed roll 16 for causing engagement with said feed roll of a strip of material, such as photographic printing paper, which is to be fed through the machine, as also clearly described in the said copending application.

The measuring roll 15 is adjacent to the said feed roll 6 and engages the paper strip 6-a as it is fed by the said feed roll. This measuring roll is rotatably carried on the shaft 7 and has a sleeve 16 extending therefrom upon which there is carried a pinion 17 that meshes with a gear 18 that is freely rotatable on the sleeve 19 which is mounted in an eccentric bushing 20 to provide for adjustment of the gear 18 relatively to the pinion 17 so as to avoid backlash between said pinion and gear.

The measuring device illustrated in Fig. 3 includes a casing 21 which is mounted on the gear 18, to rotate therewith, and the said casing contains a magnetizing coil 22 which is carried on the stationary sleeve 19 and has lead wires 23 extending therefrom for connection in an electrical circuit. The gear 18 and the casing 21 are preferably constructed of non-ferrous material, while the casing is constructed of a ferrous material so that it becomes magnetized upon energization of the magnetizing coil 22.

The said casing extends beyond the coil 22 and has an annular free edge portion 24 which is disposed adjacent to a measuring disk 25 of ferrous material that is slidable upon a stationary shaft 26 and rotatable relatively thereto. The said shaft is rotatably mounted in the sleeve 19 and carries a stop member 27 that is secured to said shaft and has a projection 28 thereon which is engaged by a post 29 that extends from the measuring disk 25 to locate the said disk in a starting position. A combined torsion and tension spring 30 is provided between the said measuring disk and stop member and is adapted to rotate the measuring disk in a clockwise direction when viewing the measuring device from the right hand end, as seen in Fig. 3. The said spring 30 also acts to draw the disk 25 towards the stop disk and thereby normally retaining it disengaged from the annular free edge portion 24 of the case 21.

The shaft 26 has secured thereon a sprocket 31 which is connected, by means of a chain 32 to the adjusting shaft 33 that is secured to the adjusting disk 34, also fully described in the said copending application.

The clutch and brake device, indicated generally at 10, includes a case having a base portion 35 and a cover portion 36. The said base portion has an axial bearing in which there is rotatably mounted a roller 37 having a head 38 upon which is carried a series of magnets 39. A magnetizing coil 40 is mounted within said base portion 35 in a position to magnetize the magnets 39 and the said coil has lead wires 41 leading therefrom for connection to the electrical circuit.

Within the cover portion 36 of said clutch and brake device, there is rotatably mounted a driving disk 42 which is slidably connected, by means of a pin and slot connection, to the shaft 43 which carries the worm pinion 19. A brake ring 44 is carried within the cover portion 36 on adjusting screws 45 that are threaded to the portion 46 of said cover and adapted to be rotated for adjusting the brake disk 44 relatively to the driving disk 42. A friction disk 47, of a suitable brake lining material, is secured to the ring 44 and adapted to be engaged by the driving disk 42. The said driving disk is normally urged into engagement with the brake disk 47 by means of a spring 48.

As shown in Fig. 2, an electric switch 49 is mounted adjacent to the measuring device and has an operating finger 50 with a roller 51 thereon which is disposed to be engaged by the post 29 to cause operation of said switch.

The operation of my improved measuring mechanism above described will be clearly understood from the illustration of Fig. 4 of the drawings and from the following description.

The strip of photographic paper is contained between the feed roll 6 and the measuring roll 15 and the pressure roll 14 and may be moved by the feed roll into a suitable cutter 52 for cutting off printed portions of the said strip in desired numbers in accordance with the adjustment of a suitable selector mechanism 53 which controls the operation of the said cutter.

When the switch 54 is closed, it will cause energization of the motor 13 and also of the magnetizing coils in the clutch and brake device 10 and the paper measuring device. The motor will then rotate the pulley 12 and thereby also rotate the rotor 38. Energization of the coil 31 will energize the magnets 39 and draw the driving disk 42 into driving engagement with said magnets, against the tension of the spring 48, and this will cause rotation of the worm gear 9. The said worm gear will then rotate the driving shaft 7 and cause rotation of the feed roll 6 in a counterclockwise direction, as viewed in Fig. 2. This will feed the strip of paper into the machine and cause the measuring roll 15 to be rotated by said paper as it is moved by the feed roll. The said measuring roll 15 will then rotate the pinion 17 and cause it to drive the gear 18 and rotate the casing 21 therewith. Energization of the coil 22 will magnetize the free annular edge portion of the said casing 21 and draw the measuring disk 25 into driving engagement therewith. This will rotate the said disk against the torsional force of the spring 30 and cause it to be rotated clockwise, thereby carrying the post 29 around the member 27 until it engages the roller 51 and operates the switch 49. The said switch will then open the circuit to the clutch and brake device and to the paper measuring device and close the circuit through the selector 53. Immediately upon the opening of the switch 49 by the post 29, and the de-energization of the said measuring device, the driving disk 42 will be forced by the spring 48 against the friction ring 47 and instantly stop rotation of the worm 9 and thereby also instantly stop rotation of the feed roll 6 and movement of the strip thereby. De-energization of the coil 22 will cause de-magnetization of the casing 21 and this will release the disk 25 and the said disk will then be pulled away from the free edge 24 and at the same time rotated in a counter-clockwise direction until the stud 29 is carried to its normal position wherein it is stopped by engagement with the projection 28.

It will be clearly understood from Fig. 4 of the drawings that when the switch 54 is closed, the motor, as well as the clutch and paper measurer, will become energized. When the switch 49 is operated by the paper measurer, it will open the circuit to the clutch and brake and the said paper measurer devices and close the circuit to the selector 53. After the selector has been operated for a predetermined number of times in accordance with its setting for the desired number of prints, the said selector will cause operation of the cutter 52 to cut off the printed portion of the strip and the operation of the said cutter will cause opening of the switch 55 and this will de-energize the motor and the entire circuit will be returned to its normal condition. If desired, the circuit may be so arranged that the motor will be controlled only by the switch 54 so that it will continue its operation as long as the said switch is closed. The operation of the feed roll will then be controlled entirely by the clutch and brake device through its control by the paper measuring device.

It will be noted that the measuring device may be adjusted by means of the wheel 34 to vary the length of photographic strip which is fed by the feed roll 6 during each operation thereof. To provide such adjustment, the wheel 34 is preferably graduated to indicate the adjustment thereof. Such adjustment is made by rotating the said wheel 34 and this will cause rotation of the shaft 33 and the sprocket 33-a which, through the chain 32, will rotate the sprocket 31. This will rotate the shaft 26 and thereby rotate the stop 27 and the said disk will then be located in accordance with the adjustment of the wheel 34 to vary the position of the stop projection 28 and thereby vary the starting position of the post 29 and the distance that it must travel from its starting position before it engages the roller 51 and operates the switch 49 and this will control the length of strip which is fed by the feed roll 6 before it causes operation of the measuring device to stop the rotation of the feed roll and the movement of the strip thereby.

It has been found that my improved measuring mechanism is extremely accurate in its operation and this is due mainly to the fact that the motor is entirely disconnected from the feed roll and that, immediately upon the disengagement of the clutch to cause such disconnection, a braking action is applied by the disk 47 to stop the rotation of the worm gear 9 and thereby bring the feed roll to a dead stop so that the override of the feed roll is eliminated and the lengths of the strip fed by the successive intermittent rotations of the said feed roll will be of exactly uniform lengths.

I claim:

1. In a machine including a feed roll for feeding a strip therethrough, an electric circuit, and a motor in said circuit for driving said feed roll, the combination of measuring means including a measuring roll in contact with said strip and driven thereby, a measuring device including a rotatable member driven by said measuring roll, a separate member adjacent to the rotatable member, means in said circuit for magnetizing said rotatable member to connect the separate member thereto for rotation thereby, an electric switch in said circuit, means carried by the separate member for opening the said switch, a clutch between said motor and the feed roll, means in said circuit for causing engagement of said clutch to connect the motor to the feed roll, and means operable upon the opening of said switch to cause disengagement of the clutch to disconnect the motor from the feed roll.

2. The subject matter set forth in claim 1 including means for braking the rotation of the feed roll upon the disengagement of the clutch.

3. In a machine having means for feeding a strip of material including a feed roll, an electric circuit and a motor in said circuit for driving said feed roll; the combination of measuring means including a measuring roll adapted to contact said strip and be rotated thereby as it is moved by the feed roll, a measuring device including a member driven by said measuring roll, a separate member adjacent to said driven member, means for locating said separate member in normal position, a clutch for connecting said motor to the feed roll, means in said circuit for causing engagement of said clutch and engagement of the separate member with the rotatable member, an electric switch operable by said separate member upon being rotated from its normal position for a predetermined distance to cause disengagement of said clutch and disengagement of the said separate member from the rotatable member, and braking means for braking the rotation of the feed roll upon such disengagement of the clutch.

4. In a machine having means for feeding a strip of material including a feed roll, an electric circuit, and a motor in said circuit for driving said feed roll, the combination of measuring means including a measuring roll in engagement with the said strip and rotated thereby, a measuring device including a member rotatable by said measuring roll, a separate member adjacent to said rotatable member, means locating said separate member in normal position, a magnetic coil in said circuit for magnetizing the said rotatable member to cause engagement of the separate member therewith, a clutch between the said motor and feed roll, a magnetic coil in the circuit for operating said clutch to cause engagement thereof for connecting the feed roll with the motor, means in said circuit for simultaneously energizing the said coils of the clutch and measuring device to rotate the said feed roll and simultaneously cause rotation of the separate member by the rotatable member, an electric switch in said circuit, and means carried by said separate member for opening said switch upon the said separate member having been rotated for a predetermined distance and thereby causing de-energization of the said coils to disengage the separate member from the rotatable member and to disengage the said clutch and thereby terminate rotation of the feed roll, and means for returning the said separate member to its normal position.

5. In a machine having means for feeding a strip of material including a feed roll, an electric circuit and a motor in said circuit, the combination of a clutch between said motor and feed roll including a magnetizing coil in said circuit adapted to cause engagement of the clutch, means in said clutch operable upon the disengagement thereof for braking the rotation of the feed roll, a measuring roll in engagement with the strip, a measuring device including a member rotatable by said measuring roll, a magnetizing coil in said circuit for magnetizing said rotatable member, a separate member adjacent to said rotatable member and slidable into engagement therewith upon energization of the said coil, a stop member for locating the said separate member in starting position, means for adjusting the said stop member to vary the starting position of the said separate member, an electric switch for closing said circuit to cause energization of the said coils and thereby causing engagement of the clutch and engagement of the separate member with the rotatable member, a separate switch in said circuit, means carried by said separate member for opening said separate switch, upon the said separate member having been rotated by the measuring roll for a predetermined distance, to cause deenergization of the said coils for causing disengagement of the clutch and disengagement of the separate member from the rotatable member, braking means in the clutch for braking the rotation of the feed roll upon the said clutch becoming disengaged, and means for returning the said separate member to its normal position.

6. In a machine including means for feeding a strip of material; the combination of a measuring mechanism including a measuring roll in contact with said strip and rotated thereby, a rotatable member driven by said measuring roll, a separate member adjacent to the rotatable member, a stop member for locating the said separate member in a starting position, means for adjusting the said stop member to vary the starting position of the said separate member, an electric circuit, a magnetizing coil in said circuit for magnetizing the said rotatable member to cause engagement of the separate member therewith, an electric switch for causing energization of said coil, a separate switch, and means carried by said separate member for operating said separate switch, upon the said separate member having been rotated by the rotatable member for a predetermined distance from its starting position, to cause de-magnetization of the said rotatable member whereby said separate member is disengaged therefrom, and means for returning the said separate member to its starting position.

7. In a machine having means for feeding a strip of material; a measuring mechanism including a measuring roll in engagement with said strip and rotated thereby, an elongated sleeve, a member rotatable on said sleeve and connected to said measuring roll for rotation thereby, a shaft extending through said sleeve, a separate member adjacent to said rotatable member and slidable relatively thereto, a stop on said shaft, a projection carried by said separate member and engageable with said stop for locating the separate member in starting position, means for rotating the said shaft to vary the position of the stop and thereby vary the starting position of the separate member, an electric circuit, a magnetizing coil in said circuit for magnetizing the rotatable member, a switch for causing the energization of the said coil to cause magnetization of the said rotatable member and thereby cause engagement of the separate member therewith to be rotated thereby in accordance with the rotation of the measuring roll, and a separate switch operable by said separate member upon being rotated from its starting position for a predetermined distance to cause de-energization of the coil to thereby demagnetize the rotatable member and cause disengagement of the separate member therefrom, means operable upon the opening of said switch for stopping the rotation of the feed roll, and means for returning the separate member to a starting position.

References Cited in the file of this patent

UNITED STATES PATENTS

| | | |
|---|---|---|
| 596,336 | Lear | Jan. 1, 1948 |
| 2,490,044 | Garbarini et al. | Dec. 6, 1949 |
| 2,727,570 | Hempel | Dec. 20, 1955 |
| 2,734,571 | Martell | Feb. 14, 1956 |
| 2,757,730 | Hempel | Aug. 7, 1956 |
| 2,785,748 | Von Stoeser et al. | Mar. 19, 1957 |
| 2,859,845 | Backman | Nov. 11, 1958 |